(12) United States Patent
McEnroe

(10) Patent No.: US 8,156,198 B2
(45) Date of Patent: Apr. 10, 2012

(54) LIVE CUSTOM MEDIA PLAY LISTS

(75) Inventor: Elizabeth R. McEnroe, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 11/275,822

(22) Filed: Jan. 30, 2006

(65) Prior Publication Data

US 2007/0180057 A1     Aug. 2, 2007

(51) Int. Cl.
*G06F 15/16*     (2006.01)

(52) U.S. Cl. ........ 709/218; 709/217; 709/219; 709/220; 709/222; 709/223

(58) Field of Classification Search .................. 709/218, 709/217, 219, 220, 222, 223, 216, 215
See application file for complete search history.

(56) References Cited

U.S. PATENT DOCUMENTS

| | | | |
|---|---|---|---|
| 6,199,076 B1 * | 3/2001 | Logan et al. | 715/203 |
| 6,931,657 B1 | 8/2005 | Marsh | |
| 2002/0059584 A1 * | 5/2002 | Ferman et al. | 725/34 |
| 2003/0220100 A1 * | 11/2003 | McElhatten et al. | 455/418 |
| 2005/0229213 A1 * | 10/2005 | Ellis et al. | 725/58 |
| 2008/0222678 A1 * | 9/2008 | Burke et al. | 725/44 |

OTHER PUBLICATIONS

"[DioneSS] AudioLogic (Professional Edition) Version 3.0.29 Released," available at <<http://homepage.ntlworld.com/thorin92/dss/software/dssad130/index.htm>>, accessed Oct. 4, 2005, 2 pages.
"Creating a playlist," palmOne Support, available at <<http://www.palm.com/us/support/userguides/zire31/us/realoned.html>>, accessed on Oct. 4, 2005; 3 pages.
"EVS Playlist Manager," A2D Solutions, available at <<http://a2dsolutions.com/p3174.html>>, accessed Oct. 4, 2005, 3 pages.
"Windows Medio Player 10 Mobile for Smartphone," Microsoft Corporation, 2004, 20 pages.
U.S. Appl. No. 10/857,688, filed May 27, 2004, Samuel Thomas Scott, III, "Strategies for Consuming Resource Items Based on a Resource Item List."

* cited by examiner

*Primary Examiner* — Jeffrey Pwu
*Assistant Examiner* — Abdelnabi Musa
(74) *Attorney, Agent, or Firm* — Lee & Hayes, PLLC

(57) ABSTRACT

List processing functionality (LPF) is described for creating a play list that defines an order in which video media programs are to be presented. Different techniques are described for creating the play list, including various manual techniques and various automatic (or semi-automatic) techniques.

16 Claims, 11 Drawing Sheets

Scenario A

Scenario C

Scenario E

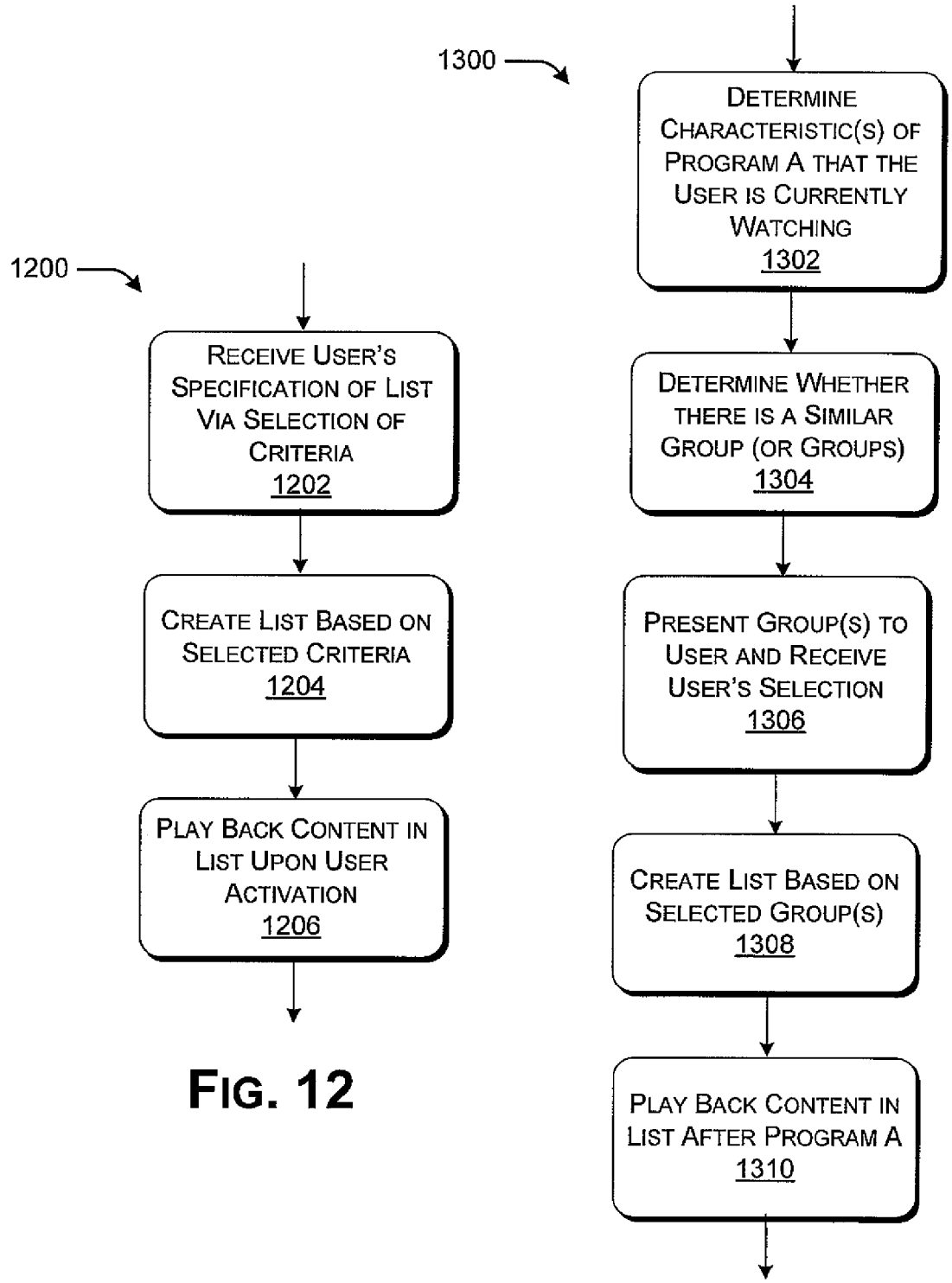

LIVE CUSTOM MEDIA PLAY LISTS

BACKGROUND

A digital recording device allows a user to record media programs and to play back the media programs at times that are convenient for the user. In a typical viewing scenario, the user can review a listing of programs that have been recorded. The user can select one of these programs for presentation, upon which the program will begin to play.

Assume that the user wishes to watch another program after the first-selected program has ended. To perform this task, the user can repeat the above selection operations. Namely, the user can activate a listing of programs that have been recorded. The user can then select another program for viewing. In general, in order to watch a series of programs, the user must explicitly select each of the programs after its predecessor has ended (or has been expressly stopped by the user).

This manner of interacting with a digital recording device can be potentially time-consuming and cumbersome. For at least this reason, there is a need in the art for a more satisfactory mechanism for playing back media programs.

SUMMARY

The following description sets forth list processing functionality (LPF) for creating a play list of media programs. The LPF plays the programs in the play list in series, based on an order defined in the play list. The LPF can be integrated into various kinds of media playback technology, such as digital video recording (DVR) technology, music playback technology, media-on-demand technology (such as Video-On-Demand technology), and so forth.

Various techniques can be used to create the play list. Exemplary techniques are summarized as follows:

According to one exemplary technique, a user can select two or more programs from a listing of programs. The LPF responds by creating a play list that includes the selected programs. The LPF can play the programs back in an order in which the user selected the programs.

According to another exemplary technique, the user can select a second program while watching a first program. The LPF responds by creating a play list that includes the second program. The LPF can automatically play the second program after the end of the first program.

According to another exemplary technique, the LPF can determine at least one characteristic of a first program that the user is watching and automatically select a second program that is deemed to be similar to the first program. The LPF can create a play list that includes the second program and offer the user the opportunity to play the second program after the first program. In one exemplary application, the LPF can prompt the user near the end of the first program to determine whether the user wishes to play the second program.

According to another exemplary technique, the user can select at least one criterion pertaining to at least one program characteristic. The LPF can respond by creating a play list of programs that that have the selected characteristic(s). The criterion can comprise one or more of: a criterion pertaining to program series; a criterion pertaining to program theme; a criterion pertaining to program source; a criterion pertaining to program popularity; a criterion pertaining to program maturity rating; a criterion pertaining to a temporal aspect of a program; a criterion pertaining to program cast; a criterion pertaining to empirical data that reflects user consumption of program information, and so on.

According to another exemplary technique, the LPF can automatically determine at least one characteristic of a program that the user is currently viewing. The LPF can then determine whether a group of other programs share this characteristic, and, if so, the LPF can create a play list that includes the group of program(s).

In one case, entries in the play list correspond to programs that the user has already recorded. In another case, the play list may specify (or may be modified to specify) one or more programs that have yet to be recorded. In one variant of the yet-to-be-recorded scenario, the LPF can prompt the user to pay a fee to add a program to the play list.

The above techniques confer a number of benefits. According to one exemplary benefit, the use of a play list allows the LPF to play a series of programs in a less cumbersome manner than heretofore known.

Additional exemplary implementations and attendant benefits of the LPF functionality are described in the following.

The subject matter set forth in this Summary section refers to exemplary manifestations of the invention, and hence does not limit the scope of the invention set forth in the Claims section.

BRIEF DESCRIPTION OF THE DRAWINGS

FIGS. 9-13 show exemplary procedures for creating lists using the LPF of FIG. 2.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth list processing functionality (LPF) for creating a play list (also known as a "playlist") of media programs. The LPF plays the programs in the play list in series, based on a playback order defined in the play list. According to one exemplary application, the LPF can be incorporated into any kind of media playback technology or other kind of technology, such as digital video recording (DVR) technology, also known a personal video recording (PVR) technology, music playback technology, media-on-demand technology (such as Video-On-Demand technology), and so forth.

According to one exemplary implementation, the media programs include a video component, an audio component, both a video and audio component, and so forth. For example, the media programs may correspond to television shows, movies, and so forth. The media programs may also optionally include or omit interactive content. To facilitate discussion, the examples discussed in the Detailed Description section will assume that the media programs include a video component that can be watched by a user upon playback; but again, the principles described herein can be applied to other kinds of media content.

This disclosure includes the following sections. Section A sets forth an exemplary system for creating play lists. Section B sets forth exemplary user interface presentations for creating the play lists. And Section C sets forth exemplary procedures for creating the play lists.

Figure 1:
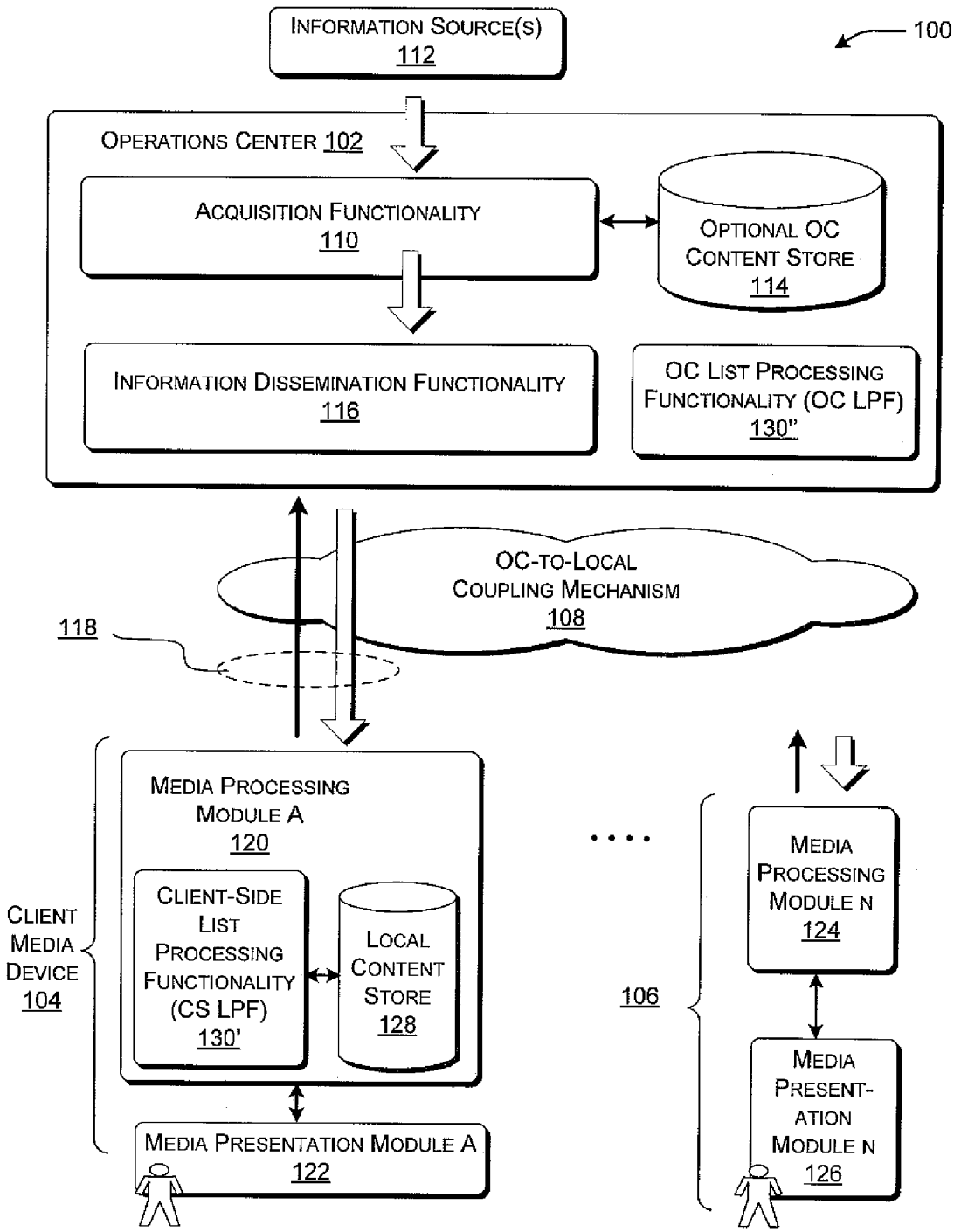
FIG. 1 shows an exemplary system for creating a play list and for playing media programs back based on the play list.
Figure 2:
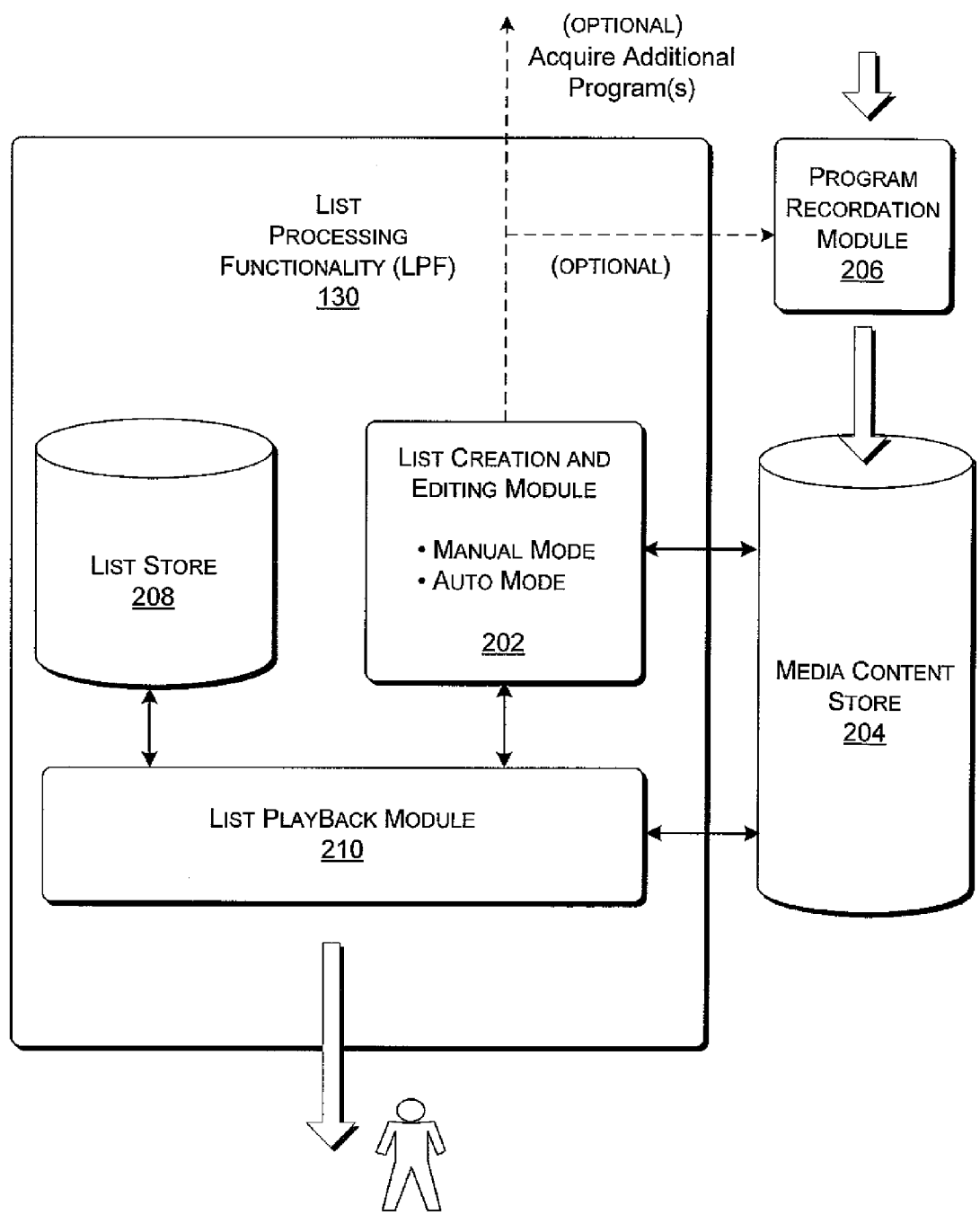
FIG. 2 shows exemplary list processing functionality (LPF) for use in the system of FIG. 1.
Figure 3:
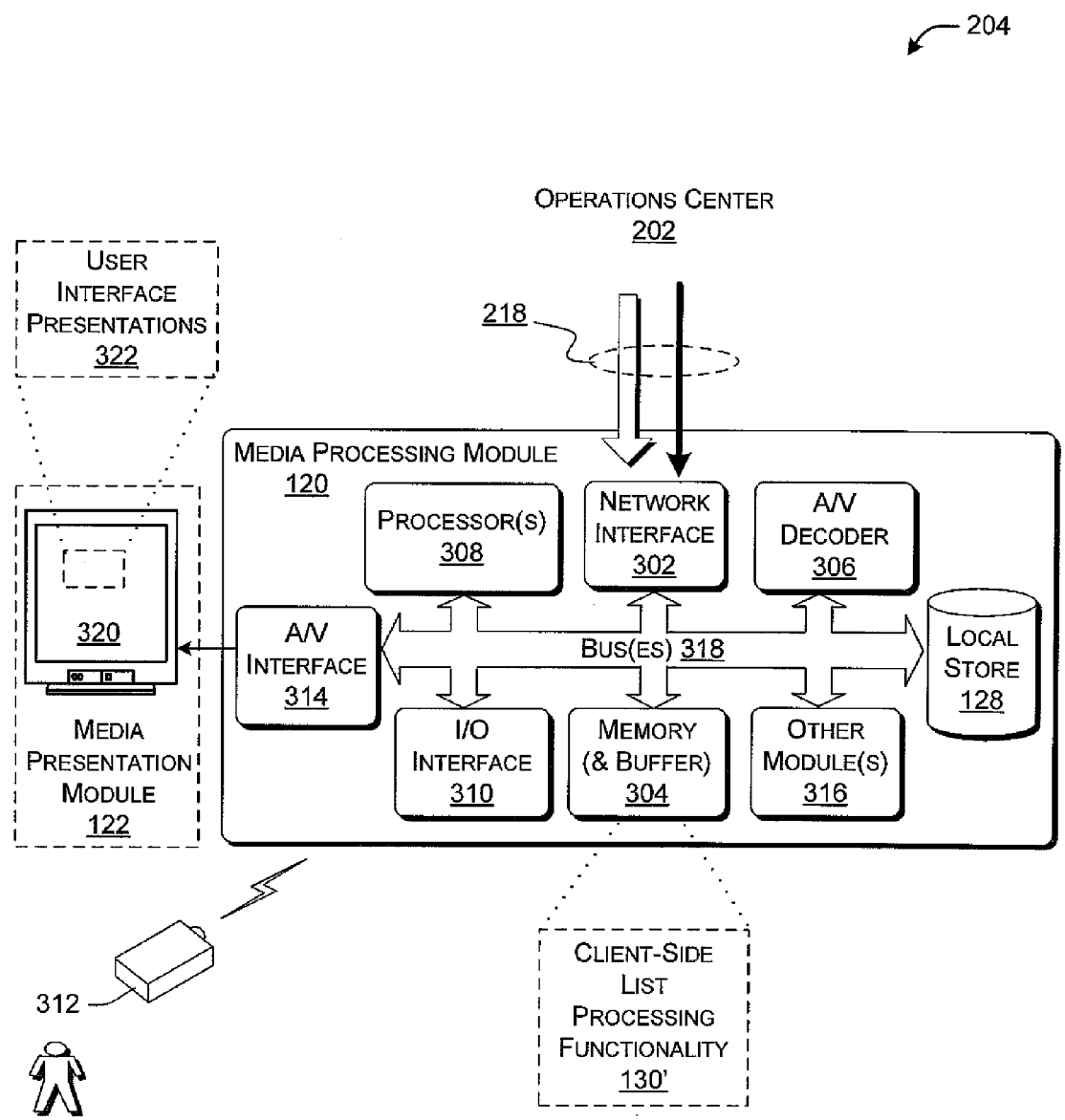
FIG. 3 shows exemplary details of client-side functionality for use in the system of FIG. 1.

A. Exemplary System (FIGS. 1-3)

Generally, any of the functions described with reference to the figures can be implemented using software, hardware (e.g., fixed logic circuitry), manual processing, or a combination of these implementations. The term "logic," "module" or "functionality" as used herein generally represents software, hardware, or a combination of software and hardware. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of the System (FIG. 1)

The list processing functionality (LPF) described herein can be used in conjunction with any technology for delivering media programs from a source of media programs to one or more end-users or other recipients. The illustrative system 100 shown in FIG. 1 uses media streaming technology to deliver digitized streams of media programs. However, other scenarios can make use of other kinds of technology for delivering programs to end-users, including terrestrial wireless transmission systems, satellite transmission systems, cable transmission systems, and so forth. Thus, the following description of FIG. 1 is to be understood as setting forth only one exemplary and non-limiting implementation of the list-processing concepts imparted herein.

By way of overview, the system 100 includes an operations center 102 for delivering media programs to a collection of client devices (104, . . . 106) via a coupling mechanism 108. The operations center 102 includes acquisition functionality 110 for supplying the programs from one or more sources 112 of such information. The sources 112 can represent any kind of entity which produces or provides media information, such as cable or satellite television providers, one or more Video-On-Demand (VOD) providers, one or more publishing houses of information, one or more library sources, any kind of Internet-enabled repository, and so on. The acquisition functionality 110 can comprise one or more server computers or other functionality dedicated to the task of retrieving the media information. The operations center 102 can optionally also include an information content store 114 for storing the media information prior to its dissemination to the client devices (104, . . . 106). The information content store 114 can be implemented as one or more databases and associated database management functionality. The system operations center 102 can also include information dissemination functionality 116 for supplying media information to the client devices (104, . . . 106) via the coupling mechanism 108. The information dissemination functionality 116 can be implemented as a collection of server modules (not shown) that facilitate the transmission of media information to the client devices (104, . . . 106).

The coupling mechanism 108 couples the operations center (OC) 102 to the client devices (104, . . . 106), and is therefore labeled in FIG. 1 as an OC-to-local coupling mechanism. This coupling mechanism 108 can be implemented in different ways to suit different technical and commercial environments. For instance, the coupling mechanism 108 can include any kind of network (or combination of networks), such as a wide area network (e.g., the Internet), an intranet, Digital Subscriber Line (DSL) network infrastructure, point-to-point coupling infrastructure, and so on. The coupling mechanism 108 can use or involve any kind of protocol or combination of protocols. In the case in which one or more digital networks are used to disseminate information, the coupling mechanism 108 can include various hardwired and/or wireless links, routers, gateways, name servers, and so on. In the case where DSL infrastructure is used to disseminate information, the coupling mechanism 108 can utilize the services, in part, of telephone coupling infrastructure and DSL processing functionality.

The architecture shown in FIG. 1 includes one or more downlink paths and one or more optional uplink paths. One pair of downlink and uplink paths is illustrated in FIG. 1 as pair 118. The downlink paths are used to forward media programs to the client device (104, . . . 106). The optional uplink paths can be used to forward user selections and other information to the operations center 102. The uplink and downlink paths can be implemented by the same communication mechanism, or by different respective communication mechanisms.

Now referring to the client-side aspects of the system 100, the client devices (104, . . . 106) can be implemented in different ways. A given client device (104, . . . 106) can represent a television set with integral IP interfacing/processing functionality, a television set with an associated set-top box coupled thereto, a digital video recorder (DVR) device, a rewritable digital video disc (DVD-RW) device, a personal computer having AV processing functionality, a music playback system, a portable personal media device, and so forth (as well as any combination of these devices). In whatever manner the client devices (104, . . . 106) are implemented, each these devices can comprise a media processing module that is communicatively coupled to a media presentation module. For instance, the client device 104 includes media processing module 120 coupled to media presentation module 122, and the client device 106 includes media processing module 124 coupled to a media presentation module 126. The media processing modules (120, . . . 124) comprise functionality for processing the media information and performing other data processing functions, and the media presentation modules (122, . . . 126) comprise functionality for presenting the output of the media processing modules (120, . . . 124). The media processing modules (120 . . . 124) can be integrated with the media presentation modules (122, . . . 126), or the media processing modules (120, . . . 124) can be separate from (but communicatively coupled to) the media presentation modules (122, . . . 126).

FIG. 1 shows an overview of the exemplary composition of the representative client device 104. This device 204 includes the media processing module 120, which, in turn, Can comprise a local content store 128. The media processing module 120 in conjunction with the local content store 128 can be used to implement media recording functionality, such as digital video recording (DVR) functionality, also referred to as personal video recording (PVR) functionality. Namely, in a conventional fashion, the media processing module 120 can allow the user to select media programs for recording in the local content store 128, and can then allow the user to play back the media programs at a later time. In an alternative implementation, the recording functionality can be entirely implemented by functionality located at the operations center 102. In this case, the operations center 102 can include a central storage (not shown) for storing media programs that have been recorded by respective users of the client media devices (104, . . . 106). In still another implementation, the recording functionality can be implemented in distributed fashion by functionality located at both the client devices (104, . . . 106) and the operations center 102.

The system also includes list processing functionality (LPF) 130 for handling all operations performed by the system 100 which pertain to play lists. A play list (also known as a playlist) defines a collection of programs to be presented to the user in series, e.g., one after the other. The play list also defines the order in which the programs are to be played back. Among its various functions, the LPF 130 includes logic functionality for allowing the user to create play lists using one or more techniques. The LPF 130 can also allow the user to play back a series of programs specified in a play list.

In the same manner as the recording functionality, the LPF 130 can be implemented in different ways to suit different technical and business environments. According to one implementation, the LPF 130 can be entirely implemented at the local level by the client media devices (104, . . . 106). For instance, FIG. 1 shows that representative client media device 104 optionally includes client-side listing processing functionality (CF LPF) 130'. In another implementation, the LPF 130 can be entirely implemented by the operations center 102. For instance, FIG. 1 shows that operations center 102 optionally includes operations center list processing functionality (OC LPF) 130". In another implementation, the LPF 130 can be implemented in distributed fashion by both the CS LPF 130' and the OC LPF 130". The remainder of this discussion will not specify the location-related aspects of the LPF. That is, in the following discussion, the general reference to LPF 130 (without a superscript) refers to any one of the implementation scenarios described above, or to yet another scenario.

A.2. Exemplary LPF (FIG. 2)

FIG. 2 provides additional details regarding the list processing functionality 130.

The LPF 130 includes a list creation module 202. The purpose of the list creation module 202 is to create a play list. As will be described at length below, numerous techniques can be used to create a play list, including manual techniques, automatic techniques, partially automated techniques, and so forth. The list creation module 202 can also be used to edit a list that has already been created, and so forth.

The creation module 202 can interact with a media content store 204 to create and/or edit a play list. The media content store 204 can comprise any single or distributed repository of media programs that have been recorded by the user or which have been recorded on behalf of the user. For instance, in one non-limiting case, the media content store 204 represents the local content store 128 shown in FIG. 1. A program recordation module 206 can be used to store programs in the media content store.

In one circumstance, the list creation module 202 constructs a play list entirely from programs that have already been recorded in the media content store 204. In another case, the list creation module 202 can also create a play list that proactively specifies one or more programs that have yet to be recorded in the media content store 204. For instance, the user may wish to create a play list at the beginning of the week and then play the list at the end of the week. In this scenario, at the time of creation, the play list may specify one or more programs that have yet to be recorded. In another case, the user may create a play list that includes a general instruction to play to all of the episodes of a particular series (or to play programs that satisfy some other general criterion or criteria). In this scenario, the play list may again specify (or more generally encompass) programs that have yet to be recorded. Information regarding programs that have yet to be broadcast can be gleaned from electronic program guide (EPG) information or from some other source(s). In yet another scenario (to be discussed in greater detail below), the LPF 130 can prompt the user at various junctures to determine if the user wishes to add yet-to-be-recorded programs to the play list, possibly in response to the payment of a fee or in response to the user taking some other action. The dashed lines shown in FIG. 2 (labeled as "optional") generally indicate different ways that the LPF 130 can add yet-to-be-recorded programs to a play list.

The LPF 130 also includes a list store 208. The purpose of the list store 128 is to store play lists created by the list creation module 202. The play lists stored in the list store 128 can be dynamically modified by the list creation module 202 based on various events, such as explicit selections made by a user, automatic selections made by the list creation module 202, and so forth.

Finally, the LPF 130 includes a list playback module 210. The purpose of the list playback module 210 is to play back one or more programs based on the lists stored in the list store 208.

A.3. Exemplary Processing Equipment (FIG. 3)

FIG. 3 provides additional details regarding the representative client media device 104 (introduced in the context of FIG. 1). To review, the media client device 104 itself comprises the above-identified media processing module 120 coupled to the media presentation module 122.

The media processing module 120 can include a number of modules for performing its ascribed tasks. The media processing module 120 shown in FIG. 3 is tailored to the processing of a stream of digitized media information. However, as stated above, the list processing concepts disclosed herein can be implemented using many other kinds of technology, including various analog-based technologies. Further, the media processing module 120 shown in FIG. 3 is configured to present media programs having a video component; but other media processing modules (not shown) can be configured to present media program having only an audio component (e.g., only a music component), and so on.

To begin with, the media processing module 120 includes a network interface module 302. The network interface module 302 can represent any functionality for receiving media information from the operations center 102 using any coupling mechanism. For example, the network interface module 302 can comprise an Ethernet NIC, a DSL modem, a cable modem, a wireless network interface, or other kind of network interface equipment. The media processing module 120 also includes memory 304. A portion of the memory 304 can optionally comprise program instructions for implementing DVR recording functionality, which encompasses the client-side list processing functionality (CS LPF) 130'. The media processing module 120 also includes an audio-visual (AV) decoder 306 for decoding (and decompressing) the received media information into its video and audio components. Decoding comprises ordering packets (if received out of order), extracting media information from the stream of received packets, and also extracting timing information that will govern the playback of the media information. The media processing module 120 also includes one or more processors 308 for executing instructions to implement the functionality of the media processing module 120. The media processing module 120 also includes an I/O interface 310 for interacting with the user via one or more input devices, such as a remote controller 312, a personal computer (not shown), a joy stick (not shown), a voice recognition mechanism (not shown), and so forth. The media processing module 120 also includes an A/V interface module 314 for providing media information in an appropriate format to the media presentation module 122. The media processing module 120 also includes the above-identified local store 128 for storing recorded programs and other data. Finally, the client processing module 226 can include various other modules 316, not specifically identified by name in the figure. For instance, the client processing module 226 can include a graphics compositor for combining a video component of the media information from the AV decoder 306 on a frame-by-frame basis with graphics information. The graphics information may comprise various user interface presentations which are overlaid on the media information. One or more busses 318 communicatively couple the above-identified components together.

The media presentation module 122 can comprise any kind of device for presenting AV information, including a CRT-type device, an LCD-type device, and so forth. In any case, the media presentation device 122 defines a display surface 320. The media processing module 122 can present one or more user interface presentations 322 on the display surface 320.

As a final note, although not shown, the components of the operations center 102 can be implemented by one or more server type computers and/or other processing equipment. These computers or equipment can have a basic architecture which is similar to that illustrated in FIG. 3, namely, comprising processors, memory, various interfaces, various buses, and so on.

B. Exemplary User Interface Presentations (FIGS. 4-8)

As noted above, the LPF 130 allows users to create play lists using numerous techniques. The following section describes representative user interface presentations that a user may use to create lists using different techniques. The LPF 130 can provide the user interface presentations on the display surface 320 of the media presentation module 122. The user interface presentations described in this section are exemplary and non-limiting. Any aspect of the user interface presentations (including display-related and functional aspects of the user interface presentations) can be modified in any manner.

B.1. Scenario A: Manual Selection of Play List Entries from List (FIG. 4)

Figure 4:
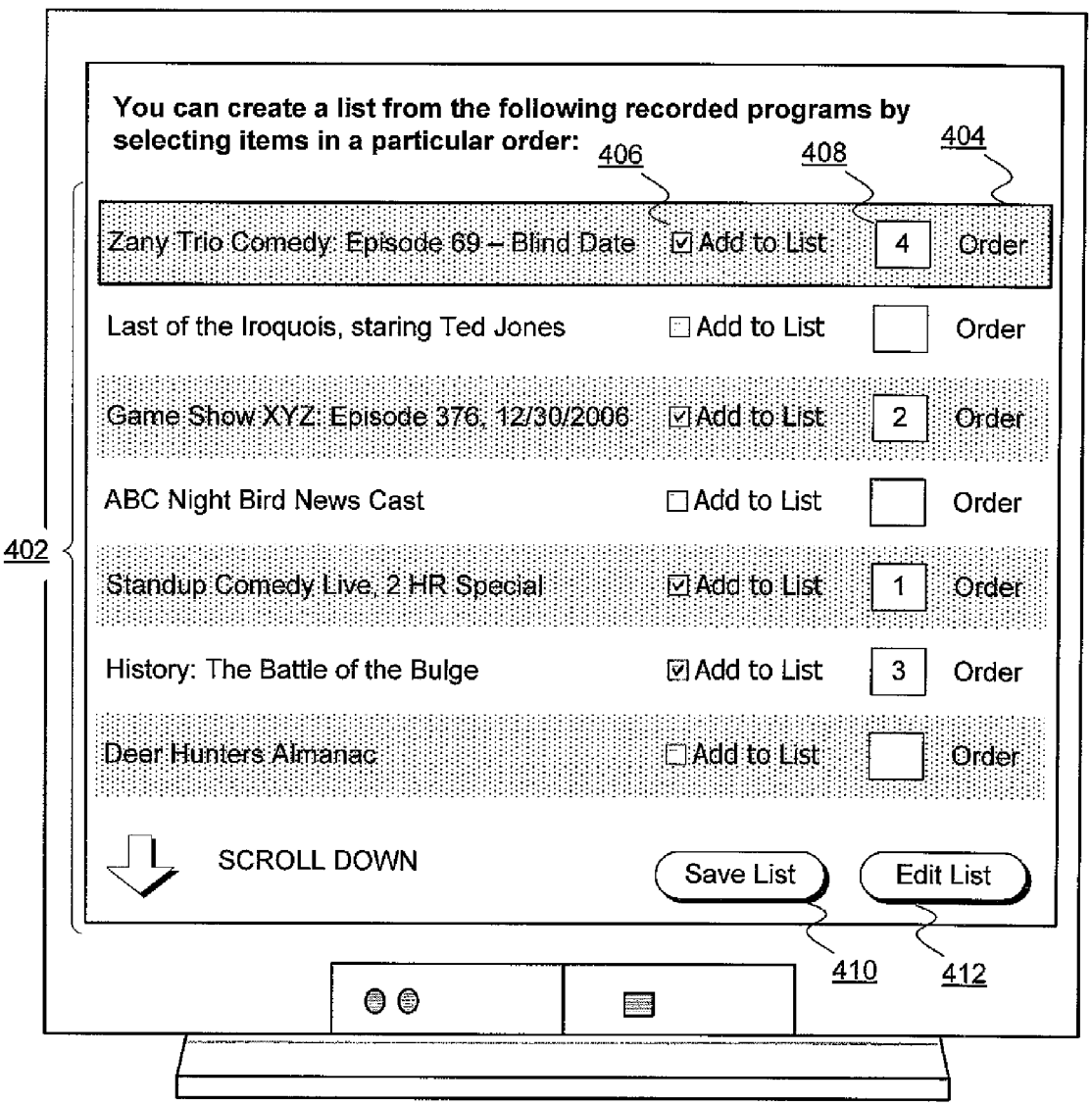
FIGS. 4-8 show various exemplary user interface presentations that allow a user to create a list using the LPF of FIG. 2.

FIG. 4 shows a first scenario A. In this scenario, the LPF 130 allows the user to activate a user interface presentation that displays a program list 402. The program list 402 lists programs that have been recorded in the media content store 204. The user may create a play list by selecting a collection of entries in the program list 402. According to one exemplary implementation, the LPF 130 defines a play order that corresponds to the order in which the user selects the programs in the program list 402. For instance, in the exemplary scenario shown in FIG. 4, the user has selected the following hypothetical programs in the following order: 1) "Standup Comedy Live"; 2) "Game Show XYZ: Episode 376"; 3) "History: The Battle of the Bulge"; and 4) "Zany Trio Comedy: Episode 69—Blind Date." Accordingly, upon playback, the LPF 130 will play back these four programs in the defined order of selection, that is, starting with "Standup Comedy" and ending with the "Zany Trio Comedy" episode.

The user interface presentation can optionally include various fields that provide feedback to the user regarding the list that the user is creating. Consider the highlighted program entry 404 within the program list 402. This entry 404 optionally includes a selection field 406 that allows the user to indicate whether or not this program should be included in the play list. The entry 404 also can optionally include an order-display field 408 that displays the highlighted program 404's order in the play list.

Other optional fields can include a save command 410. The save command 410 allows the user to formally save and name the play list created by selecting entries within the program list 402. Another optional field is an edit command 412. The edit command 412 allows the user to edit a list. For instance, the edit command 412 can display a list of programs in a play list (not shown) and allow the user to modify the list in any manner, such as by changing the order of programs in the play list, deleting programs in the play list, and so forth.

After the user has created a play list in the manner described above, the user can activate the list, upon which the four programs selected in the program list 402 will be presented in the defined order. In one implementation, the LPF 130 can present information to the user in the course of playback to alert the user to her progress through the play list. For instance, the LPF 130 can provide audio and/or visual prompts at the transition from one program to the next to alert the user to the fact that she is commencing the next program in the play list. For instance, such a prompt may take the form a message bubble which overlays the presentation of program content near the end of a program or at the beginning of a subsequent program. Or the LPF 130 can display such message content in an interstitial gap between the two programs, and so on.

In addition, the LPF 130 can provide a mechanism which allows the user to navigate within a play list and perform other actions with respect to programs in the play list. For instance, the LPF 130 can give the user the option of fast-forwarding to a next program in the play list, rewinding to a previous program in the play list, and so on. The LPF 130 can also allow the user to delete programs in the play list, such as a program Just watched, or a yet-to-be-presented program that the user does not wish to watch, and so on. The LPF 130 can also allow the user to save any program in the play list on a more permanent basis, e.g., to prevent it from being erased after playback. All of these command options can be offered to the user in various ways, such as via a central control menu. Or the LPF 130 can present certain command options to the user between programs in the play list; for example, after playing back a program in the play list, the LPF 130 can prompt the user to determine whether she wishes to delete this program.

Moreover, although not shown, an appropriate user interface presentation can be provided to allow the user to access a previously stored play list and to play it at any time. For instance, the user can activate a menu of previously stored play lists identified by name or on some other basis (not shown), and activate any play list in that menu.

B.2. Scenario B: Manual Selection of a Second Program in Course of the Presentation of a First Program (FIG. 5)

Figure 5:
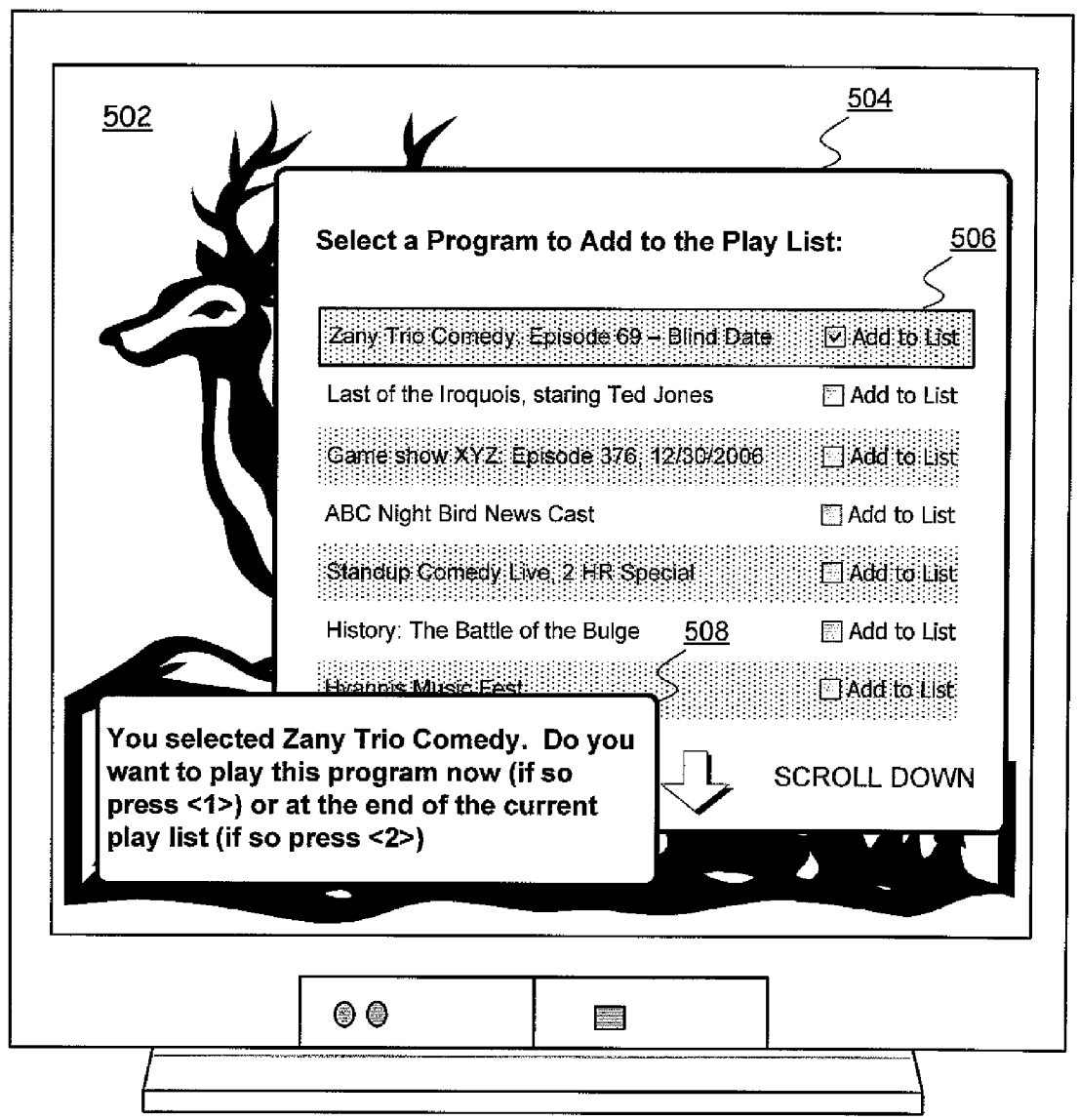

FIG. 5 shows a scenario B. In this scenario, the user happens to be watching a first program 502. In the course of watching the first program, the user may activate a user interface presentation 504. The user interface presentation 504 displays a list of other programs that the user may select from. In the illustrative case shown in FIG. 5, the user has selected a first program entry 506 in the list of programs, corresponding to the program "Zany Trio Comedy: Episode 69—Blind Date."

According to one protocol, the user's selection of this program prompts the LPF 130 to display a second user interface presentation 508. This user interface presentation 508 asks the user whether the user wishes to interrupt the playing of the first program to immediately play the second program (option 1), or whether the user wishes to play the second program after the end of the first program (option 2). If the user selects the second option, then the LPF 130 effectively creates a play list that indicates that the second program should be automatically played after the end of the first program.

The user can repeat the above-described procedure any number of times in a viewing session. On each occasion, the user is given the option of adding another program to the end of the play list. For example, if the user repeats this procedure ten times during the presentation of the first program, the user will have created a play list that includes ten programs. The LPF 130 will play the ten programs in series in an order defined by the user's selection of the programs.

In the manner described above, the user can create a play list in iterative fashion while watching a program (or in the course of watching plural programs). In contrast, the first scenario (i.e., scenario A) allows the user to create an entire play list at the outset of a viewing session, e.g., prior to playing any programs. These two techniques may appeal to different users for various reasons. For instance, scenario B allows users to create a play list in a more spontaneous and ad hoc manner compared to scenario A. In yet another implementation, scenarios A and B can be combined together. In this case, the user can create an initial play list using the procedure discussed for scenario A and then add to this play list during the course of the playback using the procedure discussed for scenario B.

Figure 6:
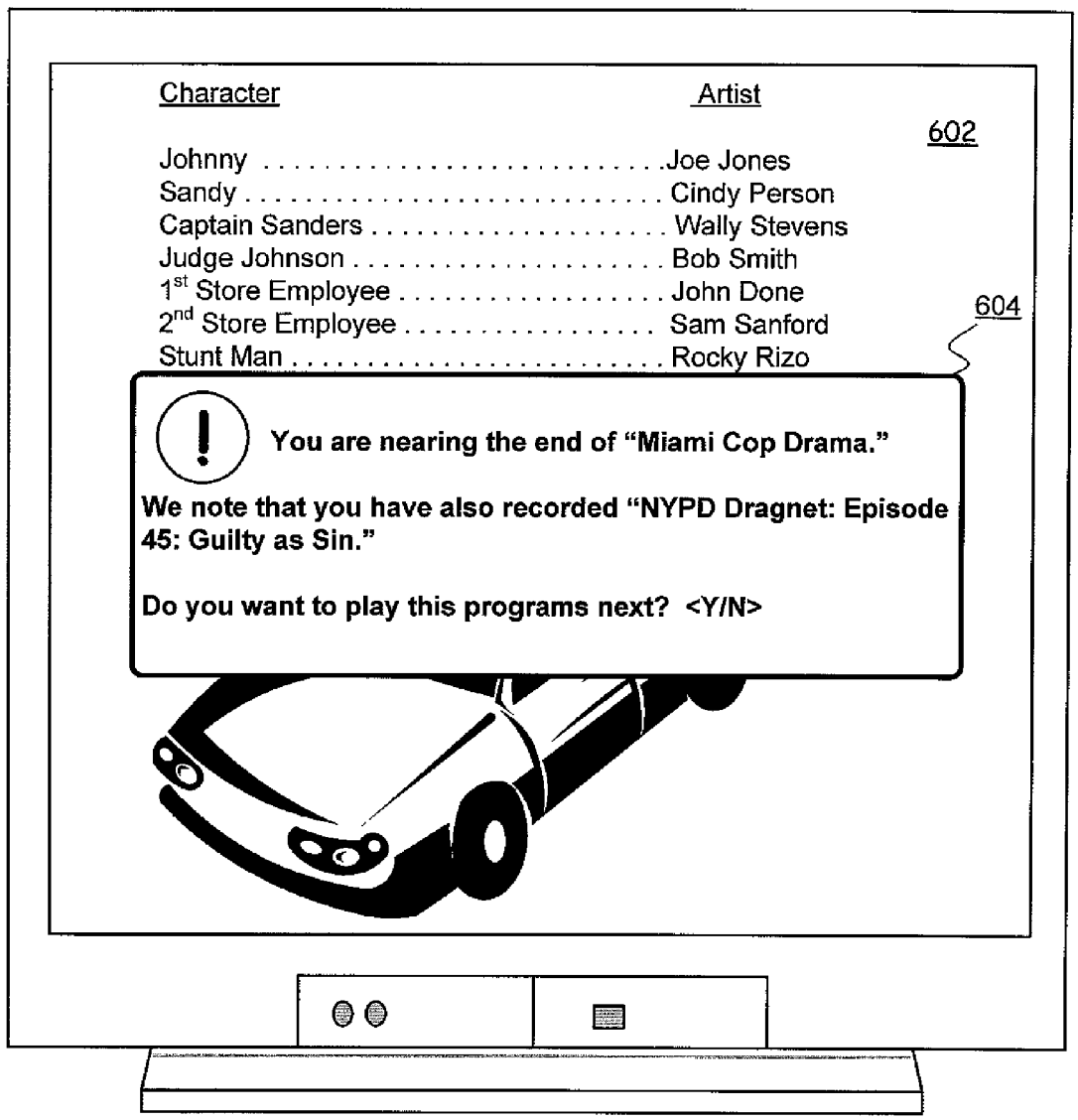

B.3. Scenario C: Automated Suggestion of a Second Program Near the End of the Presentation of a First Program (FIG. 6)

FIG. 5 shows a scenario C. In this scenario, the LPF 130 can determine that the user is watching a first program 602, such as the hypothetical "Miami Cop Drama." The LPF 130 can then determine one or more characteristics of this program, including, but not limited to: a series affiliation of the program; a theme of the program; a source (e.g., channel) of the program; a program popularity rating of the program; a maturity rating of the program; any temporal-related aspect of the program (such as when the program was created, or when the program airs); an artist or artists featured in the program, and so on. Based on these determined characteristics, the LPF 130 can automatically search the media content store 204 to determine whether there exists one or more other programs that share one or more characteristics in common with the first program 602. In the illustrative case of FIG. 6, the LPF 130 determines that the user has also recorded an episode belonging to a hypothetical program series "NYPD Dragnet." The program "NYPD Dragnet" is similar to the program "Miami Cop Drama" at least because both of these programs pertain to law enforcement dramas. That is, the two programs share a common theme.

The LPF 130 can determine similar programs in different ways. In one approach, the programs can be annotated with attribute metadata that describes the respective characteristics of the programs. The LPF 130 can find similar programs by determining the attributes of the first program 602, and then using these attributes as a search key to investigate the media content store 204 (wherein the media content store 204 includes programs that are likewise annotated with attribute metadata).

In another case, empirical data can be used to assess the relatedness of one program to another. For instance, the LPF 130 can monitor the types of programs that the user consumes over a period of time, and can also monitor the order in which the user consumes the programs. For instance, the LPF 130 may empirically determine that the user watches episodes of both Miami Cop Drama and NYPD Dragnet in a single viewing session. Or the LPF 130 may determine that the user typically watches a news program followed by a particular late night talk show, and so on. In these circumstances, the LPF 130 can mine this empirical data to determine that there is a nexus between programs. This nexus can serve as a basis for constructing play lists. In yet another case, instead of (or in addition to) relying on empirical data associated with a single viewer, the LPF 130 can examine empirical data associated with the viewing habits of a population of viewers.

The LPF 130 can present a user interface presentation 604 that gives the user the opportunity to play the second show "NYPD Dragnet" after the end of the first program 602 "Miami Cop Drama." In one case, the LPF 130 can present the user interface presentation 604 near the end of the first program 602, such as when the credits of the first program 602 begin to play. In other case, the LPF 130 can present the user interface presentation 604 at a different juncture in the first program 602, such as during a commercial that is presented in the first program 602. Other implementations can apply yet other timing-related factors to determine when to present the user interface presentation 604.

The above-described procedure can be repeated any number of times in a viewing session. For example, the LPF 130 can display another user interface presentation at the end of the second program ("NYPD Dragnet") that invites the user to select a third program. In this fashion, the play list created by the creation module 202 dynamically grows while the user watches programs, successively tacking on a new program when a program being played is about to end.

B.4. Scenario D: Manual Selection of at Least one Program Criterion (FIG. 7)

Figure 7:
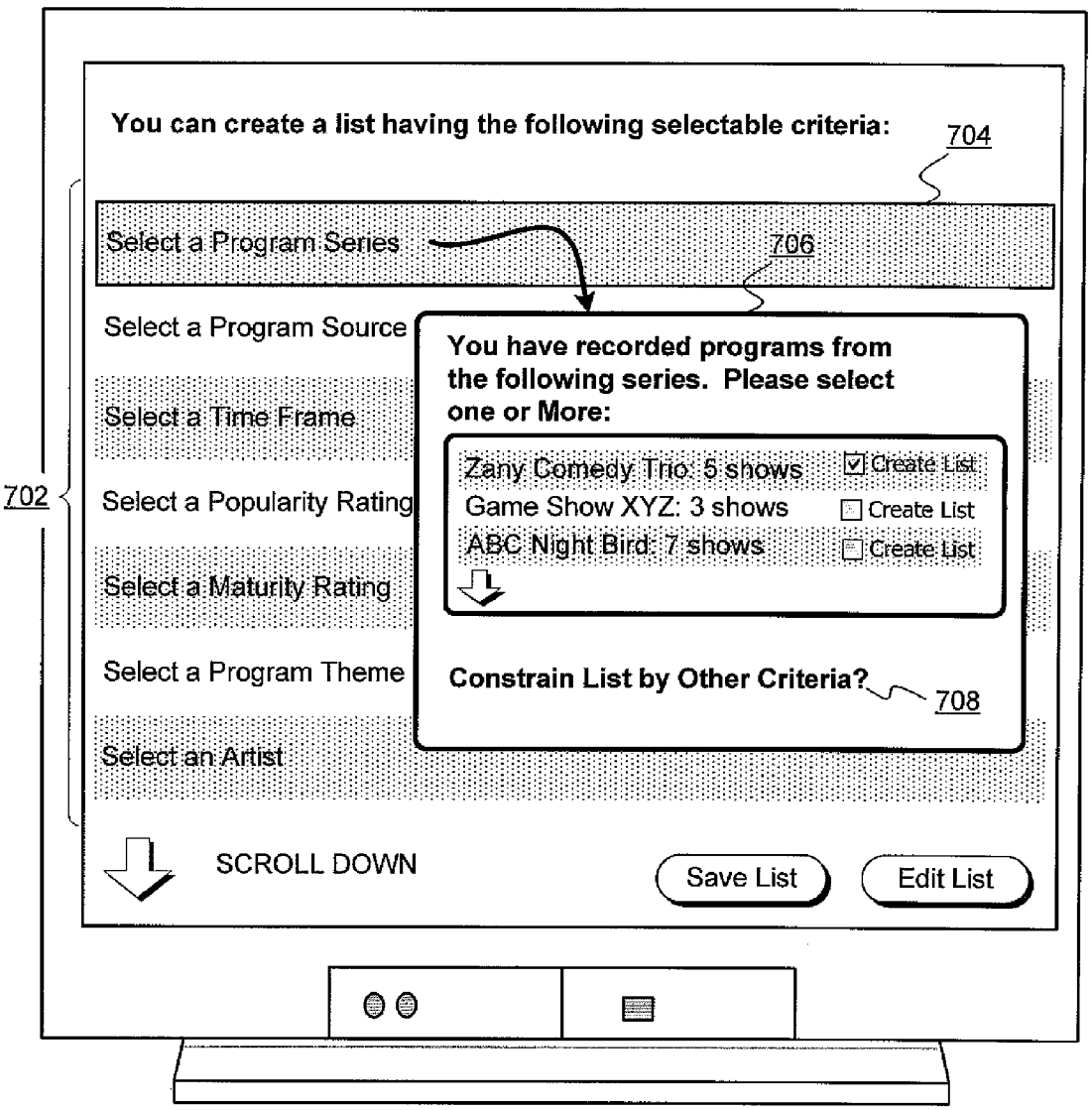

FIG. 7 shows a scenario D. In this scenario, the user activates a user interface presentation that provides a criteria list 702. The user can select a criterion (or plural criteria) from the criteria list 702. The LPF 130 responds by potentially displaying one or more collections of programs that are grouped based the selected criterion (or based on the plural selected criteria). The user may select one or more of the identified collections of programs to create a play list that includes those programs.

Consider the illustrative case in FIG. 5, where the user has selected the program criterion "Select a Program Series" 704. This prompts the LPF 130 to determine one or more collections of programs that can be grouped together by virtue of the fact that these programs belong to the same program series. For instance, in response to the selection of the criterion 704, the LPF 130 can display an exemplary user interface presentation 706. The user interface presentation 706 indicates that the media content store 204 includes at least three collections of programs that can be grouped together based on the series-related criterion 704. That is, the user interface presentation 706 indicates that the media content store 204 includes a first group of five programs pertaining to the series "Zany Comedy Trio," a second group of three programs pertaining to the series "Game Show XYZ," and a third group of seven programs pertaining to the series "ABC Night Bird." The user can pick any one or more of these collections, upon which the LPF 130 will create a play list that includes the programs in the selected collection(s). The play list can optionally arrange the programs in the order in which the programs were broadcast, or can arrange the programs based on some other factor(s).

The user interface presentation 706 optionally allows the user to further refine the selected collection, e.g., by either reducing or expanding the number of entries in the collection based on additional factors. For example, in the illustrative case of FIG. 7, the user has selected the collection corresponding to the "Zany Comedy Trio" series, which contains five programs. The user interface presentation 706 can provide a prompt 708 that allows the user to select an additional criterion or plural criteria for further refining the membership in the selected collection of programs. For instance, the user may use this option to restrict the play list to programs that aired in a particular season, to restrict the play list to programs that feature a certain artist, and so on.

The technique shown in FIG. 7 thus provides a tiered approach to program selection, meaning the user can select multiple criteria in series, potentially narrowing a selected collection of programs down through successive selections. The different primary categories shown in the criteria list 702 allow the user to originate the selection process from different subject-related starting points, e.g., series, source, time, etc. In another case, the user may select all relevant criteria at one time, such as by selecting all applicable criteria from the criteria listing 702 at the same time. Moreover, other implementations can use different mechanisms for inputting criteria. For instance, in another case, the user can specify list-creation criteria by entering a free-form search query. The search query can include keywords that define different respective criteria. Other implementations are possible.

The criterion "Program Series" was featured in the above-described example. Other exemplary program criteria may include, but are not limited to;

A criterion pertaining to program theme. The user can select this criterion to find a grouping of programs that share a common theme, such as law enforcement drama, cooking-related programs, college football, and so forth.

A criterion pertaining to program source. The user can select this criterion to find a grouping of programs that share a common program source. For instance, the user can create a play list of programs that originated from a sports channel, a news channel, a comedy channel, and so forth.

A criterion pertaining to program popularity. The user can select this criterion find a grouping of programs that share a common popularity ranking. For instance, the user can use this criterion to select a group of programs that have been watched by a large number of viewers. Popularity ratings can be gleaned from a number of sources, such as from one or more commercial ranking services.

A criterion pertaining to a program maturity rating. The user can select this criterion to find a grouping of programs that share a common maturity rating. For instance, the user can use this criterion to select a group of programs that have a general (G) ratings so as to compile a play list for presentation to children.

A criterion pertaining to any temporal-related aspect of a program. The user can select this criterion to find a grouping of programs that share a temporal-related characteristic. For instance, the user can use this criterion to compile a play list of the most recently recorded programs, or to compile a play list of programs that have been broadcast between a particular starting time and ending time. Or the user can use this criterion to compile a play list that includes programs that were created (or which originally aired) in a prescribed time period. For instance, the user might want to watch reruns of any programs originally created in the 1970's, and so on.

A criterion pertaining to program cast. The user can select this criterion to find a grouping of programs that share a common artist or common group of artists (or a common director, choreographer, and so forth). For instance, the user can select the actor "Clint Eastwood" to automatically create a play list containing programs that include this artist.

Still further criteria can be used to identify collections of programs. In any event, the LPF 130 can identify the collections of programs using various mechanisms. For example, the LPF 130 can perform an attribute-based search to define appropriate collections of similar programs. As stated above, the LPF 130 can also identify collections of programs in whole or in part using empirical data, such as empirical data that reflects the user's prior viewing history or the viewing habits of an entire population of users. For instance, the LPF 130 can form a play list based on a collection of programs that the user has not yet watched. Or the LPF 130 can form a play list based on programs that the user watches quite frequently (based on the assumption that these programs are the user's favorites).

B.5. Scenario E. Suggestion of a Group of Other Programs Based on a Characteristic of a Program that the User is Currently Viewing (FIG. 8)

Figure 8:
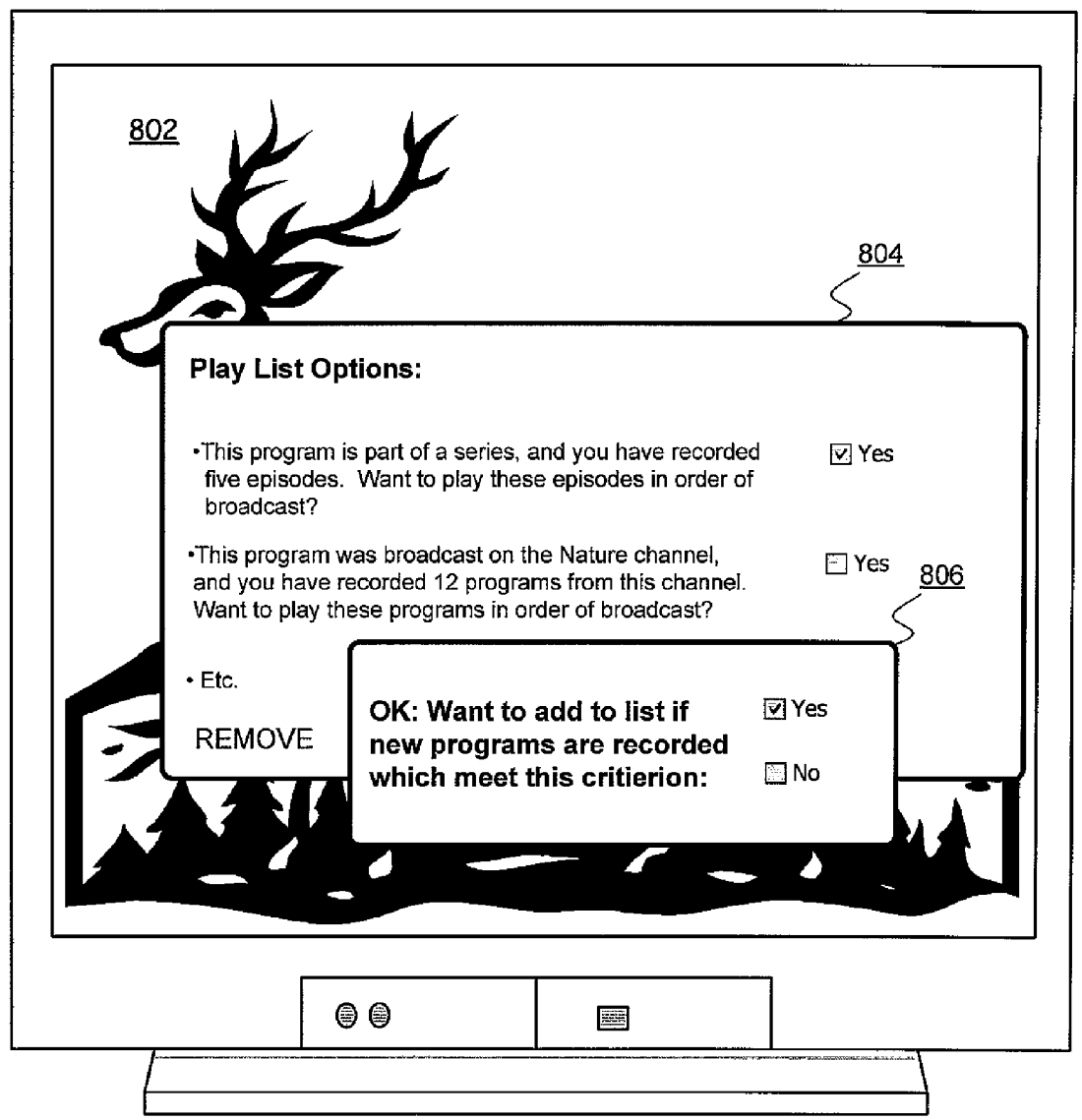

FIG. 8 shows a scenario E. In this scenario, the user is watching a first program 802, corresponding to a hypothetical show "Deer Hunters Almanac." In this scenario, the LPF 130 automatically determines whether this program is a member of a more encompassing collection of programs. It can perform this function using the attribute-based searching approach described above, and/or the empirical-based searching approach, and so on.

More specifically, FIG. 8 shows that the LPF 130 presents a user interface presentation 804 that conveys the results of its analysis. As indicated in that presentation 804, the LPF 130 has determined that the show that the user is watching ("Deer Hunters Almanac") is part of a series, and the user has previously recorded five other episodes of this series. The LPF 130 also determines that this program was broadcast on the hypothetical Nature channel, and that the user has recorded twelve programs from this channel in the past. The LPF 130 can make many other such similarity-based determinations, including a determination pertaining to any one or more of the criteria discussed above in the context of scenario D.

Upon being prompted by the user interface presentation 804, the user can opt to create a play list based on one or more of the identified collections of programs. This will prompt the LPF 130 to play the programs in the play list in series (e.g., based on the order in which these programs were originally broadcast, or based on any other factor or combination of factors). In the manner described previously, the LPF 130 can present the user interface presentation 804 near the end of the first program 802 or at any other juncture in the presentation of the first program 802.

To facilitate discussion, the various scenarios were explained above in the context of the selection of programs that are already recorded and stored in the media content store 204. Any of the scenarios can also be used to select programs that have not yet been recorded, e.g., but may be scheduled for presentation in the future (as determined by information gleaned from an EPG), or may be offered by some other system, such as a media-on-demand system (such as a VOD system).

For example, in the case of scenario E, the user indicates that he wishes to create a play list that contains other episodes related to the program that the user is currently watching ("Deer Hunters Almanac"). After making this selection, the LPF 130 can present another user interface presentation 806 that asks the user whether he wants to also dynamically add programs to the play list if any new episodes of this series are recorded subsequent to creation of the play list. This might be useful in various circumstances. For instance, the user may plan to watch television for several hours. There is a chance that, in the time period in which the user is watching television, another program that is related to the topic of interest of the play list may be broadcast and recorded. If so, the LPF 130 can add this new program to the end of the play list so that the user can watch it in due course. In another case, the user may create a play list but the user does not immediately play it, or the user may create a play list but the user terminates it midway through its playing. In this case, there is a possibility that, in the interim period in which the play list is not being played, new programs will be recorded that pertain to the topic of interest of the play list. The LPF 130 can dynamically add these programs to the play list so that when the user begins playing the play list, he can watch the most current programs related to the theme of the play list. Still other variations of this basic design motif are possible.

In another case, the LPF 130 can invite the user to select one or more yet-to-be-recorded programs to be added to a play list. For instance, the LPF 130 can identify certain attribute-based characteristics of the programs identified in the user's play list. The LPF 130 can then identify one or more other yet-to-be-recorded programs that share the determined characteristics. The LPF 130 can then invite the user to select such yet-to-be-recorded programs. In the manner described above, the LPF 130 can alternatively (or also) identify related programs based on empirical data. In other circumstances, the LPF 130 can make suggestions that do not necessarily have a nexus to the user's play lists. For instance, the LPF 130 may wish to promote certain programs based on advertising revenue it has received from the producers of such programs, and so on; the LPF 130 can invite a user to watch such programs even though such programs may not have a bearing on a play list that the user happens to be consuming at that moment.

In one exemplary commercial context, the LPF 130 can interact with a media-on-demand system (such as a VOD system) to provide suggestions to a user. For example, after watching an episode of "Miami Cop Drama" (which the user has already recorded), the LPF 130 can interact with the media-on-demand system to determine that there is another program—NYPD Dragnet—that the user has not yet recorded but which the user may obtain by paying a fee (or by taking some other action). Accordingly, the LPF 130 can Present a message to the user near the end of the Miami Cop Drama program which invites the user to purchase the NYPD Dragnet program for a fee. This approach may provide a valuable marketing opportunity. In one specific example, the LPF 130 can allow the user to watch a first part of a two-part episode; at the end of the first part, the LPF 130 can allow the user to watch the second part upon paying a fee. Depending on the how the system is set up, the user can play back a pay-for-view program only once, or can play back the program for an limited amount of "rental" time, or can play back the program on an unlimited basis, and so on.

In another case, the user may have expressly created a play list that includes one or more programs that are available on a pay-per-view basis. Upon reaching such a program in the play list, the LPF 130 can prompt the user to pay for this program to consume it. Or the LPF 130 can perform such prompting at the time of list-creation.

Still other permutations of this technique are possible.

C. Exemplary Method of Operation (FIGS. 9-13)

FIGS. 9-13 describe the operation of the system 100 in flowchart form. To facilitate discussion, certain operations are described as constituting distinct steps performed in a certain order. Such implementations are exemplary and non-limiting, Certain steps described in these flowcharts can be grouped together and performed in a single operation, and certain steps can be performed in an order that differs from the order shown in the flowcharts. As the functions described in these flowcharts have already been explained in prior sections, Section C will serve primarily as a review of those functions.

C.1. Scenario A: Manual Selection of Play List Entries from List (FIG. 9)

Figure 9:
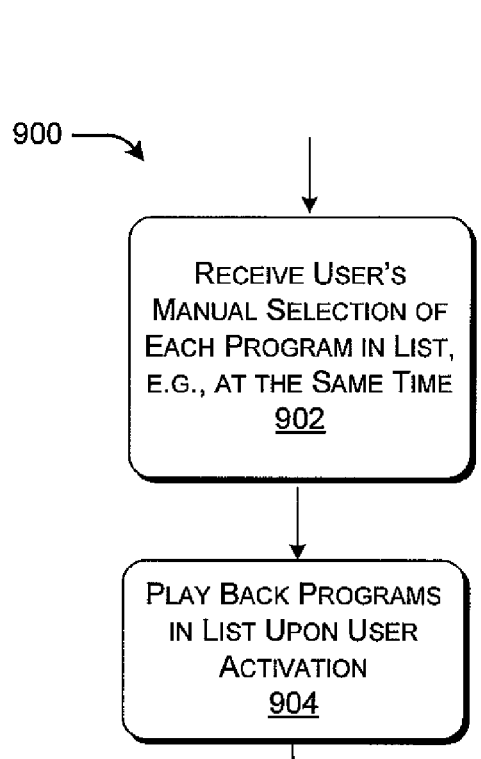

Procedure 900 of FIG. 9 corresponds to the above-described protocol in which the user manually selects each program of the play list. In step 902, the LPF 130 receives the user's manual selection of each program. In one case, step 902 can involve collecting all of the user's selections at one time, e.g., using the user interface presentation shown in FIG. 4). In step 904, the LPF 130 plays back the programs in the play list upon instruction from the user.

C.2. Scenario B: Manual Selection of a Second Program in Course of the Presentation of a First Program (FIG. 10)

Figure 10:
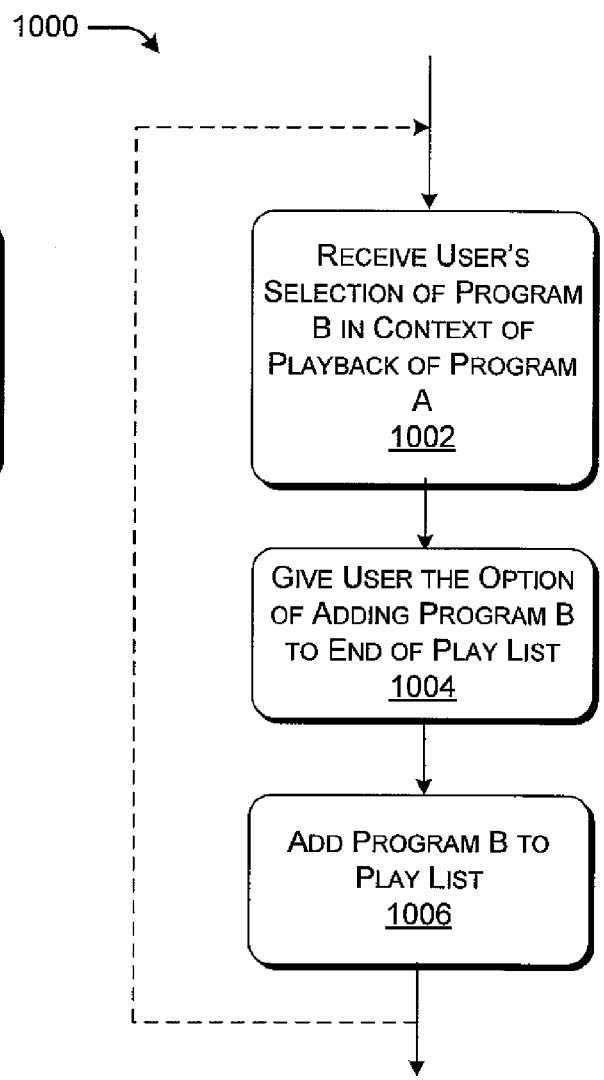

Procedure 1000 of FIG. 10 corresponds to the above-described protocol in which the user selects a second program in the course of watching a first program. That is, in step 1002, the LPF 130 receives the user's selection of a program B in the context of the playback of a program A. In step 1004, the LPF 130 gives the user the option of adding program B to a play list, meaning that program B will play after program A. In step 1006, the LPF 130, in response to the user's selection in step 1004, adds program B to the play list.

C.3. Scenario C: Automated Suggestion of a Second Program Near the End of the Presentation of a First Program (FIG. 11)

Figure 11:
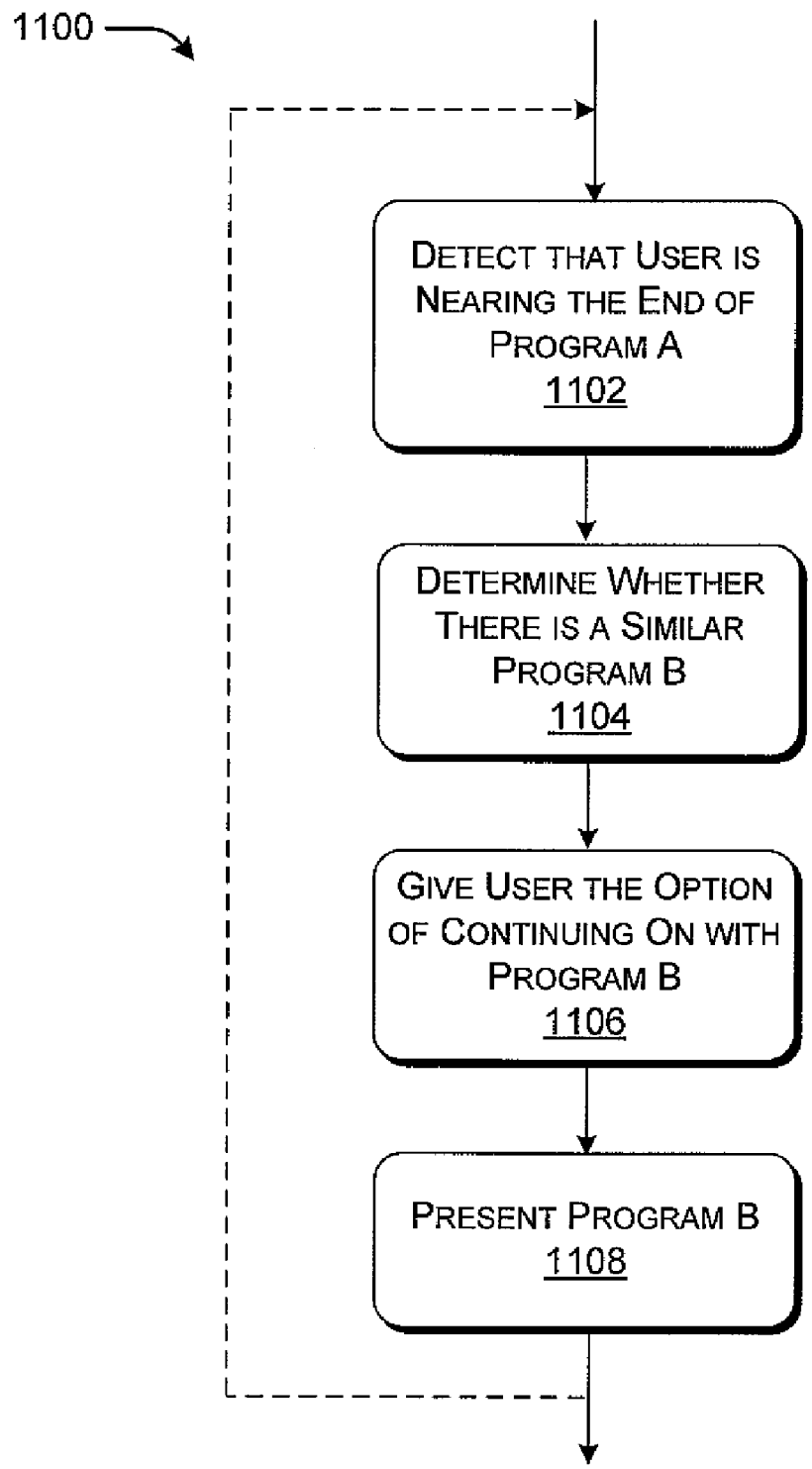

Procedure 1100 of FIG. 11 corresponds to the above-described protocol in which the LPF 130 automatically suggests a second program to the user in course of the user's consumption of a first program. That is, in step 1102, the LPF 130 detects that the user is watching a program A. In step 1104, the LPF 130 determines whether there is a program B that has one or more characteristics in common with program A (based on attribute-based analysis, empirical-based analysis, etc.). In step 1106, the LPF 130 gives the user the option of adding program B to a play list so that it will play after the end of program A. In step 1108, the LPF 130 plays program B after the end of program A.

C.4. Scenario D: Manual Selection of at Least One Program Criterion (FIG. 12)

Procedure 1200 of FIG. 12 corresponds to the above-described protocol in which the LPF 130 allows the user to create a play list based on the selection of one or more program criteria. That is, in step 1202, the LPF 130 receives the user's creation of a play list via the selection of one or more criteria. FIG. 7 shows one exemplary user interface presentation that allows the user to make such criteria selections. In step 1204, the LPF 130 creates the play list based on the user's selections. In step 1206, the LPF 130 plays back the programs in the play list.

C.5. Scenario E: Suggestion of a Group of Other Programs Based on a Characteristic of a Program that the User is Currently Viewing (FIG. 13)

Procedure 1302 of FIG. 13 corresponds to the above-described protocol in which the LPF 130 suggests a collection of other programs based on the user's consumption of a current program. That is, in step 1302, the LPF determines one or more characteristics of a Program A that the user is currently watching. In step 1304, the LPF 130 determines whether there is a similar group (or groups) of programs which share the determined characteristic(s) (based on attribute-based analysis, empirical-based analysis, etc.). In step 1306, the LPF 130 presents the various determined groups to the user (e.g., using the user interface presentation 804 of FIG. 8), and then receives the user's selection of a group or groups. In step 1308, the LPF 130 creates a list based on the selected group(s). In step 1310, the LPF 130 coordinates the playback of the programs in the play list.

The five scenarios defined above are to be understood as exemplary, non-exhaustive, and thus, non-limiting.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for constructing a play list for presenting media programs, the method comprising:
   presenting a first program;
   receiving a user-submitted selection of a second program while presenting the first program;
   prompting for user input to indicate a user preference to either interrupt the presenting of the first program to immediately present the second program or to present the second program after completion of the first program, the prompting occurring at a predetermined time during the first program while the first program is being presented;
   generating the play list based on empirical data that reflects presentation of the first program and the second program, the empirical data being used to assess relatedness between any two programs and to determine whether there is a nexus between any two programs, the play list being generated based at least in part on user-selection of a combination of programs that have previously been recorded and programs that have yet to be recorded and that have yet to be broadcast; and
   customizing the play list by adding one or more programs based on a shared characteristic between the one or more programs and the first program or the second program.

2. The method of claim 1, wherein the first program and the second program each comprise a user-recorded program.

3. The method of claim 1, the method further comprising receiving a user selection of a third program while another program is being presented, and adding the third program to the play list.

4. The method of claim 1, wherein the user selects the second program any time during presentation of the first program without being prompted to make a selection.

5. The method of claim 1, wherein the user selects the second program approximately at the end of the first program after receiving a prompt to make a selection.

6. One or more machine-readable storage media containing machine-readable instructions for implementing the method of claim 1.

7. Functionality including respective logic configured to perform each of the presenting a first program, receiving the user-submitted selection of a second program, prompting for user input, generating a play list, and customizing the play list, as recited in claim 1.

8. A method for constructing a play list for presenting media programs, the method comprising:
   identifying at least two program criteria, the criteria including:
      a criterion pertaining to program cast; and
      a criterion pertaining to empirical data that reflects user consumption of program information, the empirical data being used to assess relatedness between any two programs and to determine whether there is a nexus between any two programs, and the empirical data describing an order in which programs are typically consumed by a population of viewers;
   automatically constructing a play list based on the at least two criteria;
   presenting at least one program in the play list based on a playback order defined in the play list;
   adding one or more recorded programs to the play list based on at least one shared characteristic between the one or more recorded programs and the at least one program;
   prompting for user input to determine a user request to add media programs yet to be recorded to the play list in response to payment of a fee; and
   adding a particular media program to the play list in response to the user request to include a payment for the particular media program.

9. The method of claim 8, the method further comprising:
   presenting a selection user interface that enables user selection from among the at least two criteria, the at least two criterion being identified via the selection user interface.

10. One or more machine-readable media containing machine-readable instructions for implementing the method of claim 8.

11. Functionality including respective logic configured to perform each of the identifying at least two program criterion, automatically constructing a play list, and presenting at least one program specified in the play list of claim 8.

12. Recording functionality for recording video media programs received from a media provider, the recording functionality comprising:
   a storage device;
   logic configured to record a plurality of programs in the storage device;
   list processing functionality for processing play lists, comprising:
      logic configured to construct a play list that specifies a playback order in which at least two programs stored in the storage device are to be presented, the logic configured to construct the play list further being configured to receive a user-submitted selection of at least a second program while a first program is concurrently presented;
      logic configured to customize the play list by adding one or more programs based on a shared characteristic between the one or more programs and at least one of the at least two programs;
      logic configured to prompt for user input to indicate a user preference to either interrupt the presenting of the first program to immediately present the second program or to present the second program after completion of the first program, the prompt being presented at a predetermined time prior to completion of the first program; and logic configured to present the at least two programs in the playback order when it is determined that a user would like to present the second program after completion of the first program;

the logic configured to construct the play list further being configured to identify at least one criterion and to select the at least two programs based on at least one of the following criteria:

a criterion pertaining to program cast; or a criterion pertaining to empirical data that reflects user consumption of program information, the criterion pertaining to empirical data being established by monitoring an order in which programs are typically consumed by the user and by a population of other viewers, the empirical data being used to assess relatedness between any two programs and to determine whether there is a nexus between any two programs; and logic configured to present the play list and allow the user to select a stored program from one or more previously stored play lists.

13. The recording functionality of claim 12, wherein the playback order is defined by an order in which the user selects the at least two programs.

14. The recording functionality of claim 12, further comprising logic configured to automatically select at least one second program based on assessed similarity of the at least one second program with a first program that is being presented.

15. The method of claim 12, wherein the at least one criterion comprises one or more of:
a criterion pertaining to program series;
a criterion pertaining to program theme;
a criterion pertaining to program source;
a criterion pertaining to program popularity;
a criterion pertaining to a program maturity rating; or
a criterion pertaining to program timeframe.

16. The method of claim 8, wherein the at least one criterion further comprises one or more of:
a criterion pertaining to program series;
a criterion pertaining to program theme;
a criterion pertaining to program source;
a criterion pertaining to program popularity;
a criterion pertaining to a program maturity rating; or
a criterion pertaining to program timeframe.

* * * * *